J. P. B. FISKE.
BRICKMAKING APPARATUS.
APPLICATION FILED JAN. 2, 1907.
974,782.
Patented Nov. 8, 1910
3 SHEETS—SHEET 1.
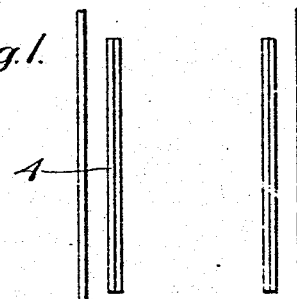
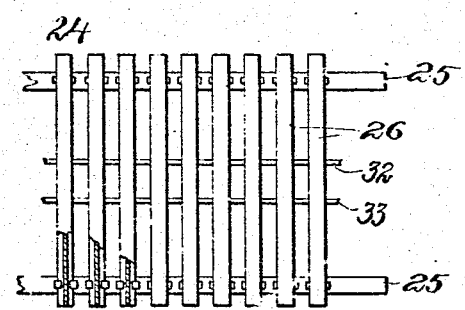
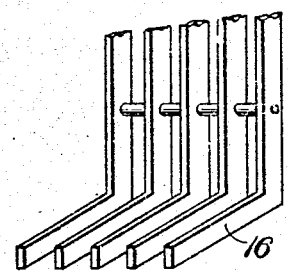
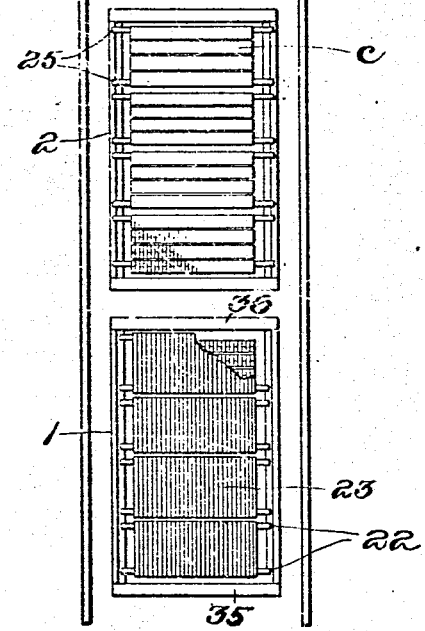
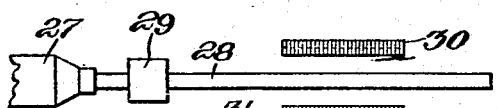
Witnesses:
Edward Maxwell
M. J. Spalding
Inventor:
Jonathan P. B. Fiske,
by Geo. W. Maxwell,
Attorney.

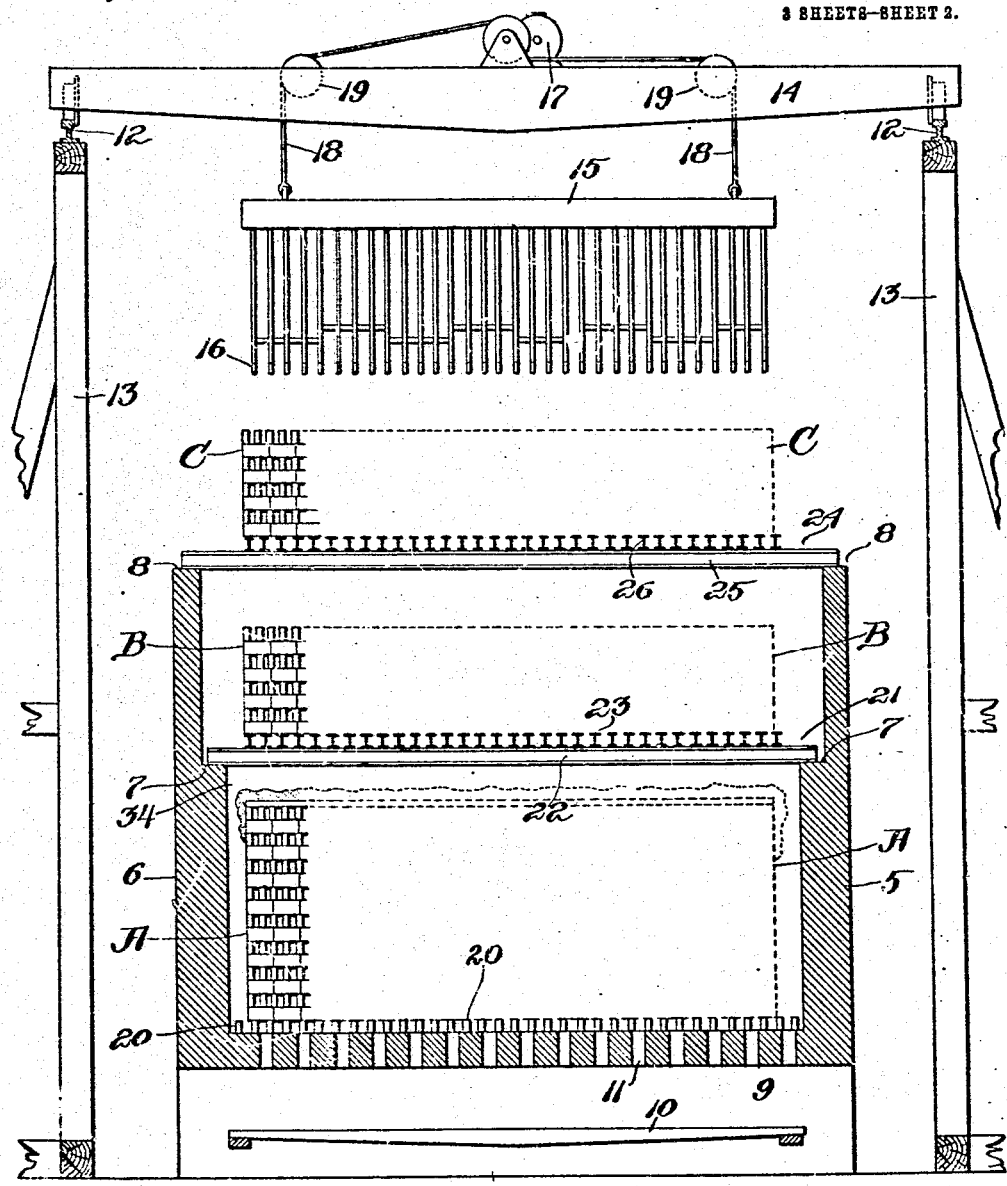

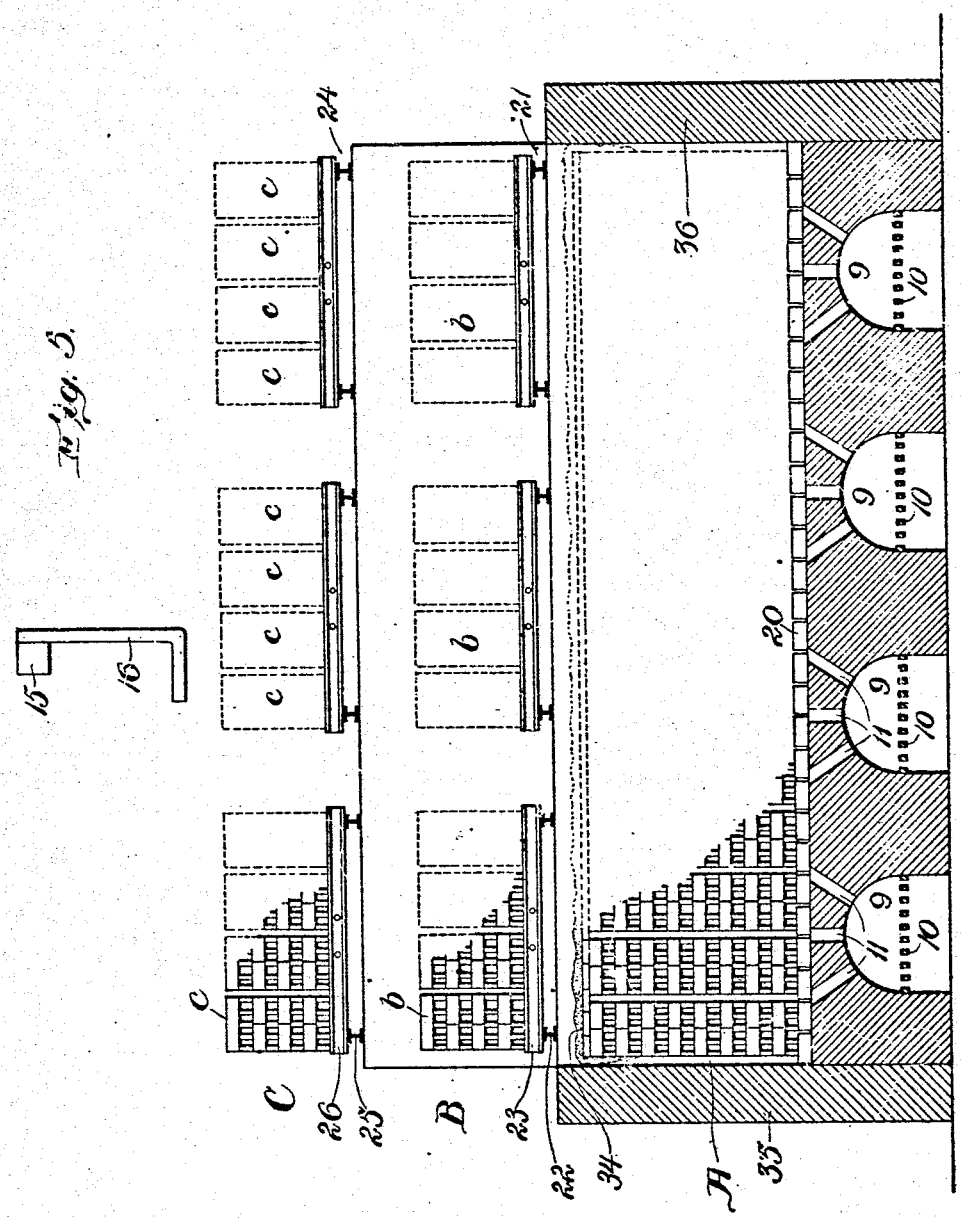

UNITED STATES PATENT OFFICE.

JONATHAN P. B. FISKE, OF NEWTON, MASSACHUSETTS, ASSIGNOR TO RAYMOND C. PENFIELD, OF NEW YORK, N. Y.

BRICKMAKING APPARATUS.

974,782.  Specification of Letters Patent.  Patented Nov. 8, 1910.

Application filed January 2, 1907. Serial No. 350,359.

*To all whom it may concern:*

Be it known that I, JONATHAN P. B. FISKE, a citizen of the United States, residing at Newton, in the county of Middlesex and State of Massachusetts, have invented an Improvement in Brickmaking Apparatus, of which the following description, in connection with the accompanying drawings, is a specification, like letters on the drawings representing like parts.

My invention relates to a system of handling bricks and comprises apparatus by which bricks may be manufactured and handled entirely by machinery, with great expedition and minimum loss. Its main object consists of drying bricks on a burning and cooling kiln, thereby using all the waste heat, and producing superior bricks, as will be apparent from the following description.

I provide preferably a special kiln having open ends and top and removable supporting racks in connection with an overhead carrier capable of transporting a large load or unit of stacked bricks. The kilns are arranged end to end in a series of five or more. I superimpose on the top of the burning bricks a series, preferably two, of green bricks, the lower of said two series being previously partially dried, this superposing of green bricks enabling me to dry the bricks in the presence of moist air which is tempered by the upward draft of hot air through the entire mass of bricks, so that not only does the moisture in the air vary, decreasing downward toward the burning bricks at the bottom, but it gradually diminishes as the superposed series of bricks dry out. In other words, the bricks are dried out in perfectly tempered air, which automatically varies to meet the requirements of the changing condition of the bricks themselves. Having filled the lower portion of the kiln with dried bricks, I put first the lower removable rack in position and then cover it with a complement of partly dried green bricks, then placing the top or upper rack in position, which in turn is covered with a complement of green bricks. As it takes much longer to burn bricks than to dry them, the two upper series or complements of bricks will be removed and others take their place during one burning. For this purpose preferably the bricks are arranged in three or more tiers in the kiln and the racks are made in corresponding sections. The end tier of bricks having been removed, the top series in the next tier is then placed on the lower rack of the first tier just above the burning bricks. The top rack of said second tier is then put in position on the first tier above the partially dried bricks thus placed (which were just taken from said rack in its former position) and is then loaded with green bricks from the brick machine. The dried bricks from the lower rack of the second tier are then removed and used for filling the bottom of another kiln for burning. This leaves the rack at said second kiln empty and it is thereupon filled with partially dried bricks from the top rack of the third tier, said rack being then moved into position over said bricks at the second tier and filled with green bricks. The dried bricks from the third tier are now placed with the other loads of dried bricks from the preceding tiers in the other kiln for burning, and the bottom rack is filled with partially dried bricks from any convenient source, as for instance from the top series of the first tier, or in case there are more than three tiers, then from the top of the fourth tier. A rack is then placed above these bricks and is loaded with green bricks. This process is continued in rotation until the kiln is entirely burned and substantially cool, the heat from the burning and cooling being used for drying and the dried and partially dried bricks on the removable racks being removed, by my apparatus, in the midst of the burning operation.

Roughly stated it takes about three days for watersmoking bricks, during which the gases therefrom cannot be used for drying purposes as they are too moist, and it takes approximately three days for settling and three days for cooling. The heat from the settling or burning and the cooling is used for drying green bricks in my process and the kiln which is watersmoking does not have any complements of superposed bricks. By my invention not only is the handling of the bricks continuous, but I am enabled to dry the bricks on a burning kiln where a man could not live, to place them or remove them by hand, and yet by my mechanism the bricks are placed on and removed from said burning kiln and the cooling kiln with perfect ease and freedom, thereby utilizing the heat to the best advantage and effecting decided economies.

I arrange my kilns in a series of preferably five or more, so that one kiln may be cooling, a second settling, a third watersmoking, the fourth being filled and the fifth being emptied. This enables me to keep the same series of operations going on continuously and progressively, using the kilns in rotation and each time filling a forward kiln with the dried bricks from the second and third kilns back while the intervening kiln (which has just been loaded with its complement of dried bricks) is watersmoking during its preliminary burning. As soon as the bottom of said forward kiln (which we will suppose is the fourth) has been filled with dried bricks, as stated, from the first and second kilns, the watersmoking commences. Meanwhile the watersmoking of the third kiln having been finished its bottom racks are filled with the partially dried bricks from the next kiln back, i. e., the second kiln, and the top racks are then placed in position and filled with green bricks from the brick machine. By this time the next kiln farther ahead, i. e., the fifth kiln, has been entirely emptied and is in turn filled with dried bricks from the second and third kilns (i. e., the two kilns just back of the one last filled, which was the fourth) and the watersmoking of the fifth kiln is commenced. The lower removable racks are then put in place in the fourth kiln when the latter has been watersmoked, and are filled with partially dried bricks from the third kiln, the top racks are then put in position and filled with green bricks. Meanwhile it will be understood that in each kiln the rotation of movements first explained has been going on, with the result that the cooling and settling kilns are kept approximately filled. In each case the heat from the burning and the cooling does all the necessary drying without the use of any separate drier as heretofore commonly employed. This eliminates not only the separate drier structure, but all the accompanying furnaces, steam pipes, air-circulation fans and stacks, saves the extra fuel, labor, etc. The green bricks being at the top receive the moist air from the lower bricks, which tempers the drying air for said upper bricks, the moisture gradually diminishing and the air becoming gradually drier and drier as the two upper series of bricks dry out. This prevents the cracking of the green bricks which would take place if they were placed at once on the lower rack. To give added capacity and to enable the racks to be transferred from kiln to kiln at the proper time and in the proper sequence, and to insure the proper tempering of the air and sequence of dried and partially dried bricks, I employ a plurality of racks and divide the bricks into three horizontal series, viz., one of burned bricks, another of partially dried bricks which are being completely dried, and a third of green bricks which are being partially dried.

The constructional details of my apparatus will be more fully understood from the following description thereof taken in connection with the accompanying drawings, in which I have shown one simple embodiment of my invention, which however is capable of a wide variety of embodiments.

In the drawings, Figure 1 is a top plan view of the apparatus; Fig. 2 is a fragmentary plan view of a portion of one of the movable racks; Fig. 3 is a perspective view of a portion of the carrier; Fig. 4 is an enlarged transverse sectional view of the apparatus; and Fig. 5 is an enlarged longitudinal sectional view thereof.

I first construct a series of kilns, herein designated as 1, 2, 3, 4, respectively, each comprising opposite side walls 5, 6, having intermediate ledges or any convenient means of support 7 and top ledges or supporting means 8. I prefer that these supporting means 7 and 8 shall be formed as a part of the wall, although if a scoved kiln is used (in which the wall is built up separately each time the kiln is loaded), the supporting function of the ledges 7 and 8 may be performed by providing any form of rigid frame or holding means for sustaining the superposed brick bodies as will be further explained later on. These kilns may have any suitable kind of firing means known in the art, being herein shown as having firing arches 9 provided with grates 10 and fire holes 11. At the opposite sides of these kilns I provide raised tracks 12 and supporting frames 13, on which travels an overhead crane 14 supporting a brick lift or carrier 15 having hook-shaped fingers 16, and lowered and raised by a usual crane engine or electric hoist apparatus 17 by chains 18 passing over pulleys 19. This apparatus may be of any usual kind, preferably such as shown and described in my Patent No. 646,207 of Mar. 27, 1900, and which therefore need not be herein explained in further detail. On the bottom of the kiln I preferably provide a usual fixed layer 20 of fire bricks to receive the bricks which are to be burned, and for the ledges or other supporting means 7 I provide removable racks 21 consisting of I-beams 22 adapted to span the width of the kiln and rest on the ledges 7, 7, and short cross I-beams 23 secured thereto so as to form a preferably unitary rack or grid for receiving the bricks. A second or upper rack or grid 24, is provided, consisting of I-beams 25 and 26, the same as the lower rack 21, and adapted to rest on the ledges or other means of support 8, 8. The bricks are provided by any suitable apparatus, as by a brick machine 27 delivering to a belt 28 adjacent a brick cutter 29, the freshly cut bricks being transferred from the belt 28 to stacking stands or stations 30, 31, as explained in my before mentioned patent. Each rack is provided with centrally arranged longitudinal lifting bars 32, 33 arranged apart sufficiently to permit the rack to balance on the hook-shaped fingers 16 of the brick lift and yet arranged to leave sufficiently long openings at either side thereof to permit the hooks to enter between the beams 26 to engage said bars 32, 33. As each kiln is filled with its complement of dried bricks to be burned, a usual platting 34 of bricks or bricks and clay is placed over the same, and it will be understood that in case permanent side walls are not used, the temporary side walls may then be built, and the removable end walls 35, 36, are then placed in position to close the ends of the kilns, said walls being either of a temporary or permanent character, preferably in practice the former.

For clearness of understanding I will first describe the system of rotation of handling the bricks with reference to an individual kiln.

It will be observed, viewing Fig. 5, that I have provided three tiers of superposed bricks, each tier consisting of a body of bricks $c$ and a body of bricks $b$ with their respective individual racks, so that the three corresponding bodies make two courses or series C, B respectively, the remaining series being indicated as A. Let it be supposed that the kiln is full, as shown, the brick lift first removes one of the upper bodies, say from the right hand tier of partially dried bricks $c$ to its proper place in another kiln and then removes the rack, which is thus left empty. The body of bricks $b$ in the same tier is carried to a kiln which is being filled. Next the top body of bricks $c$ from the next tier to the left is removed from that tier and placed on the rack of the first tier just emptied. The top rack from this second tier is then placed in position over the bricks on the first tier and filled with green bricks from the brick machine. The bricks $b$ from the second tier are then carried to the kiln which is being filled. The bricks $c$ from the last tier to the left are then taken from that tier and placed on the bottom rack of the second tier. The rack thus left empty is then placed over the bricks just placed in the second tier and filled with green bricks from the brick machine. The remaining bricks $b$, $i. e.$, from the bottom of the third tier, are then taken to the kiln which is being filled. Thereupon the same process takes place with reference to the next adjacent kiln and the top body of bricks from its right hand tier is placed on the empty bottom rack of the last tier mentioned in the other kiln, and the top rack which previously supported said bricks is moved into position above them. The same series of operations take place in this second kiln which I have just explained in detail for the first kiln. The superposed bricks in the first kiln having remained there the desired length of time for drying, the operation is repeated. The above rotation of bricks is continued on each kiln during the settling period and also during the cooling period, thereby getting the benefit of all the heat for the purpose of drying the superposed bricks. As a kiln becomes nearly cooled, additional bricks are not placed thereon, the superposed bricks being simply removed in the sequence of operations above outlined. In this way the rotation of operations progresses continuously throughout the series of kilns, the handling of the respective bodies of superposed bricks taking place at all times on those kilns which are settling and cooling, the dried bricks being taken therefrom, body by body to the kiln ahead which is being filled, the partially dried bricks taking the place in each instance of the dried bricks thus removed, and green bricks taking the place of the partially dried bricks as the latter are transferred from the top series C to the middle series B, and the successive bodies $b$ of dried bricks transferred to the kiln which is being filled, thus becoming the series A.

It will be understood that the kilns may be larger or smaller than I have indicated, with the result that the procedure will take place more expeditiously or less expeditiously accordingly. In any event the brick lift takes successive units of stacked green bricks from the stands 30, 31 and deposits the same on racks 24 until one body of a given tier is completed. Similarly the brick lift takes partially dried bricks unit by unit from a rack 24 and deposits them on a rack 21 until the entire body for that tier is completed. And the brick lift likewise takes successive units of the stacked dried bricks from a rack 21 and deposits them on the fixed bottom layer 20 of the kiln which is being filled. As the latter holds more dried bricks than one series B, the series A is not completed until the dried bricks from more than one series B have been deposited.

It will be understood that the number of kilns required and the number in operation at any given time depends upon the speed with which it is desired to push the manufacture.

My invention resides in steaming and drying green bricks by placing them on a burning kiln and transferring them in segregated bodies while the kiln is still burning or cooling, said bricks being transferred in such order or sequence that the bricks next to the burning bricks are already partially dried and the entirely green bricks are above these partially dried bricks and get the benefit of the moisture or steaming process derived from the intermediate partially dried bricks. This not only greatly facilitates the drying process, but it prevents the cracking of the bricks due to too sudden drying, and it accomplishes the drying by the heat of the burning kiln and the cooling kiln directly applied to the green bricks.

By the term "rack" I mean to include any supporting platform or horizontal partition or other means so constructed as to be capable of transmitting freely the drying and steaming heat directly from the burning or cooling bricks to the superposed bricks, as explained.

As already intimated, the form of kiln may vary, and although I prefer that both ends shall be open, the front end may be closed. The purpose of leaving the rear end of the kiln open is to permit the hooks of the brick lift to drop out readily from the last row of bricks when placing the latter and to enter readily beneath the first row of bricks when removing the bricks. Accordingly it will be evident that all that is required is a proper open space to permit the required movement of the brick lift. I prefer to accomplish this by leaving the end of the kiln open, although it will be understood that it may be accomplished otherwise.

It will be evident that by my apparatus I am enabled to maintain a constant movement of various portions of the bricks during the burning, and the transfer of the various bodies of stacked bricks to the various racks proceeds right along notwithstanding the continual upflow of heat from the burning kilns.

I do not herein claim the method, but reserve the same for a copending application.

Having described my invention, what I claim as new and desire to secure by Letters Patent is, 1. In a brick making apparatus, a kiln having provision for burning a lower complement of dried bricks, said kiln having an open top, a rack for supporting above said open top a load of bricks above the burning bricks, and supporting means for supporting said rack directly above said burning bricks.

2. In a brick making apparatus, a kiln having provision for burning a lower complement of dried bricks, a removable rack for supporting a load of bricks above the burning bricks, and supporting means for supporting said removable rack directly above said burning bricks.

3. In a brick making apparatus, a kiln having provision for burning a lower complement of dried bricks, a rack for supporting a load of bricks above the burning bricks, supporting means for supporting said rack directly above said burning bricks, a second rack for supporting a second body of bricks to be dried, and supporting means for supporting said second rack directly above the bricks on the first rack in position to receive the heated gases from the first mentioned burning bricks.

4. In a brick making apparatus, a kiln having provision for burning a lower complement of dried bricks, a removable rack for supporting a load of bricks above the burning bricks, supporting means for supporting said removable rack directly above said burning bricks, a second removable rack for supporting a second body of bricks to be dried, and supporting means for supporting said second removable rack directly above the bricks on the first removable rack in position to receive the heated gases from the first mentioned burning bricks.

5. In a brick making apparatus, the combination with a kiln having permanent side walls, provided with supporting means adapted to receive a rack and permit the same to be moved bodily therefrom with a load of bricks, of said brick-supporting rack adapted to support a large mass of superposed bricks, said rack consisting of a horizontal open-work platform, permanently united together as a whole, and lifting means permanently secured to said platform in position to be out of contact with said superposed mass of bricks when stacked on the platform, said lifting means having a lateral width relatively to said platform for giving stability of position to the platform when said lifting means is engaged by a raising device for transporting the rack and its load of bricks from the kiln.

6. In a brick making apparatus, a kiln having permanent side walls, normally open at the top, said side walls having supporting means intermediate their height and a removable rack for supporting a complement of bricks between the upper portions of said side walls above said rack.

7. In a brick making apparatus, a kiln for burning bricks, having permanent side walls provided with rack supports intermediate their top and bottom, and a removable rack, through which the heat and products of combustion can pass among the bricks, adapted to rest on said intermediate rack supports of said walls and arranged to receive a complement of bricks thereon, permitting the bodily removal of the rack and bricks together from the kiln.

8. In a brick making apparatus, a kiln having permanent side walls, said side walls having supporting means intermediate their height and also adjacent their tops, and separately removable racks for resting on said respective supporting means.

9. In a brick making apparatus, a series of kilns in line with each other, a brick carrier, an overhead traveling means for supporting said carrier and guiding the same longitudinally over said series of kilns, each kiln having a lower burning compartment and provision for an upper drying compartment, and removable bottoms in the form of heat-transmitting racks for receiving bricks to be dried, said racks being changeable from one kiln to another, and said carrier having means for so removing said racks from one kiln to another and including lifting means to lift bricks in a body from said racks.

10. In a brick making apparatus, a series of open top brick kilns, a brick supporting rack in one kiln removable therefrom to a similar position in another kiln, means for bodily moving said racks, said kilns having bottom brick burning compartments and supporting means for said racks above said burning compartments.

11. In a brick making apparatus, a series of open top brick kilns, a plurality of brick supporting racks in one kiln individually removable therefrom to any other kiln, means for bodily moving said racks, said kilns having bottom brick burning compartments and a plurality of separated supporting means above said burning compartments for supporting said plurality of racks in separated position to receive a corresponding plurality of brick bodies to be dried by the heat from the burning compartments.

12. In a brick making apparatus, a series of open top brick kilns, a brick supporting rack in one kiln removable vertically therefrom to a similar position in another kiln, said kilns having bottom brick burning compartments and supporting means for said racks above said burning compartments, and means for carrying the bricks in stacked loads to and between the kilns.

13. In a brick making apparatus, a series of open top brick kilns, a brick supporting rack in one kiln removable therefrom to a similar position in another kiln, means for bodily moving said racks, said kilns having bottom brick burning compartments and supporting means for said racks above said burning compartments, said moving means including means for carrying the bricks in stacked loads to and between the kilns.

In testimony whereof, I have signed my name to this specification, in the presence of two subscribing witnesses.

JONATHAN P. B. FISKE.

Witnesses:
 GEO. H. MAXWELL,
 WM. J. PIKE.